US00H002282H

(19) United States
(12) Statutory Invention Registration
Squire et al.

(10) Reg. No.: US H2282 H
(43) Published: Sep. 3, 2013

(54) AUTOMATIC EYE TRACKING CONTROL

(75) Inventors: Peter N. Squire, Alexandria, VA (US); Robert L. Coons, Milford, VA (US); Allison Popola, King George, VA (US)

(73) Assignee: The United States of America, as represented by the Secretary of the Navy, Washington, DC (US)

(21) Appl. No.: 13/373,750

(22) Filed: Nov. 23, 2011

(51) Int. Cl.
*H04N 5/252* (2006.01)

(52) U.S. Cl. ..... 348/211.11
(58) Field of Classification Search ..... 348/211.11
See application file for complete search history.

(56) References Cited

U.S. PATENT DOCUMENTS

2009/0189974 A1 * 7/2009 Deering ..... 348/46
2012/0113209 A1 * 5/2012 Ritchey et al. ..... 348/14.02
2012/0154557 A1 * 6/2012 Perez et al. ..... 348/53

* cited by examiner

*Primary Examiner*—Daniel Pihulic
(74) *Attorney, Agent, or Firm*—Gerhard W. Thielman; Oscar A. Towler, III

(57) ABSTRACT

An apparatus and method are provided for rapid and hands free switching among plural devices. Signals from such devices include output from plural security cameras, outputs from plural command and control devices, outputs from plural sensors in, e.g., a chemical plant or nuclear power plant, etc. An eye tracker observes changes in an operator's line of sight, thereby inferring a change in the particular one of the plural devices the observer now wishes to observe, and, through an interlock, switches control of that device to the operator. This eliminates the need for the operator to manually switch control, e.g. by keyboard strokes, mouse clicks, or by manually causing lengthy dwell time on the selected device. This in turn makes switching faster, and reduces operator fatigue by considerably reducing physical actions necessary to switch among devices.

7 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AUTOMATIC EYE TRACKING CONTROL

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention pertains to systems and methods by which an operator may monitor and control several different devices by permitting selectable switching among the devices, the devices either standing alone or on other platforms such as military ships or aircraft.

Conventional systems in which an operator monitors in real time several different locations are widespread, in law enforcement, the military, and in the larger society, e.g. the perimeter about a chemical or nuclear plant. A common feature of such systems is use of a plurality of monitors, such as plural security cameras or the like, the output of each being viewed by an operator, who can selectably switch control among the monitors so as to operate a particular selected one, e.g. to pan/tilt/zoom a selected camera.

SUMMARY

Conventional tracking systems yield disadvantages addressed by various exemplary embodiments of the present invention. Accordingly, objectives achievable by exemplary embodiments include reduction of the effort, physical and mental, to operate such systems, increasing the number of devices in such systems that an operator can control effectively at one time, decreasing the time an operator needs to switch among devices, reducing operator stress caused by frequent shifting among systems monitors, and permitting an operator to switch control among monitors in such systems without the need to use hands, or any operator extremity.

In accordance with these and other objects made apparent hereinafter, the invention concerns a system having a plurality of monitors, a display apparatus, and an eye tracker. Each of the monitors is adapted to perform one or more functions controllable by an operator, and in which the plurality of monitors is further disposed to produce an output signal.

The display apparatus presents, responsive to outputs of the monitors, a plurality of displays, each of the displays corresponding to a respective one of the monitors, and being visually intelligible to the operator. The eye tracker is disposed effective to determine the specific one of the plurality of displays the operator is looking at, and, in response, to generate a signal to enable operator control of the monitor corresponding to that display. In this manner, control among the monitors switches automatically as the operator switches the display looked at, and thus spares the operator the need to manually send a signal change enable or disable monitors.

These and other objects are further understood from the following detailed description of particular embodiments of the invention. However, the invention is capable of extended application beyond the precise details of these embodiments. Changes and modifications can be made to the embodiments that do not affect the spirit of the invention, nor exceed its scope, as expressed in the appended claims.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

Figure 1:
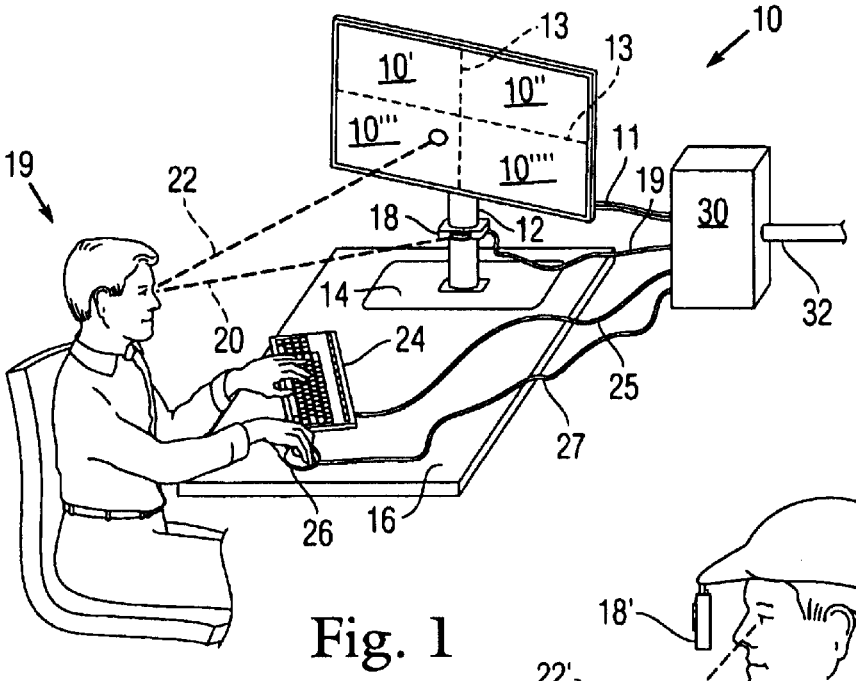
FIG. 1 is an isometric elevational view of an exemplary embodiment, shown with an operator therefor.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC) or a floating point gate array (FPGA) or other related component.

Conventional systems require that the operator view outputs of the cameras and, depending on what the operator sees, switch to one particular camera and control it, for example to pan/tilt/zoom a camera to get a better look as something suspicious.

The first such example includes the Department of Homeland Security's Virtual-Fence, a series of networked microwave towers to hold sensors, cameras and communications equipment, helping agents monitor the border to detect movement and keep out illegal immigrants and drug smugglers. Because the system has plural cameras and other sensors, to operate the system effectively the system operator must constantly manually shift a control to shift among the sensors. This results in the operator constantly executing numerous physical movements that require a corresponding mental decision at each step, a process which can quickly overload the operator mentally, and quickly wear the operator out physically. As a practical matter, this limits how long an operator can effectively work the system at one time, and limits how many devices an agent can effectively manage at one time. A particular difficulty with this way of operating the system is that it requires the operator to perform multiple steps when switching between devices, for example were the operator about to switch from one device to another, the operator would, first, have to identify which device to switch to, then, second, to execute the device switch, and, third, to operate the device.

The second such example involves Camera surveillance systems in stores that permit a viewer to monitor plural critical points in the store simultaneously so as to keep an eye on inventory and prevent its theft. The constant executing of switches among cameras limits both effective operator time on the system, and the number of cameras the operator can manage.

The third such example can be Shipboard Surveillance Systems such as are on U.S. Navy ships, in which an operator must simultaneously monitor outputs from plural cameras and other detectors to guard against threats to the ship. Information given to the inventors from experience on one Navy warship was that, with more than two contacts to monitor, a system operator would be saturated.

The fourth such example involves Security systems for the perimeter of secure facilities, such as chemical or nuclear plants or military bases. Studies have shown that in the Virtual Perimeter Monitoring System at the Naval Surface Warfare Center, Dahlgren Division, the operator must execute a minimum of five physical steps to control one camera, and thus must constantly be executing those five steps again and again.

The sixth example represents a single operator monitoring multiple unmanned vehicle (UV) platforms, who needs to quickly alter the movement of a single UV. To gain control of a single UV, the operator must perform several steps to control the platform, or assets on the platforms, which increase the time it takes for an operator to gain control of the UV.

Figure 2:
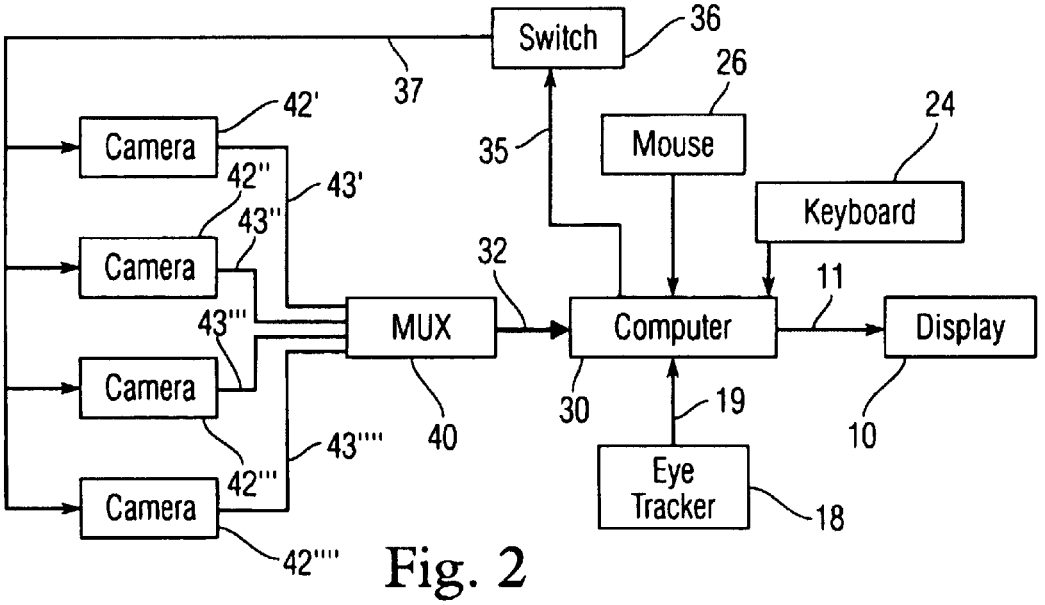
FIG. 2 is a schematic view of the embodiment.

With reference to the drawing figures, wherein like numbers indicate like parts throughout the several views, FIGS. 1 and 2 show an embodiment according to the invention in which an operator 19 can selectably view and control several security cameras 42 (illustrated in FIG. 2 as four in number, although the exact number as shown is arbitrary and not limiting).

FIG. 1 in particular shows an operator 19 sitting at a work station having, inter alia, a computer screen 10 divided by dotted lines 13 into quadrants 10', 10", 10''', and 10''''. These dotted lines are for purposes of illustration, and in practice need not appear on screen 10, more about which below. Screen 10 sits, via stand 12 and base 14, on table top 16, which has on it keyboard 24, and mouse 26, connected by respective cables 25 and 27 to computer 30.

Computer 30 communicates with screen 10 by cable 11, as well as with member 18 by cable 19, and with other elements (see FIG. 2) by cable 32. Operator 19 is seated facing screen 10, and looks directly at a point within quadrant 10''' along line of sight 22. Attached to stand 12 is eye tracker 18, which scans operator 19, and, in particular, the eye of operator 19 along line of sight 20 to determine the direction of line of sight 22. Given the position of operator 19 at table 16, this infers the quadrant of screen 10 which operator 10 is viewing; here, again, 10'''.

Member 18 can be any conventional eye tracker, and preferably is one that infers line of sight 20 by measuring the ratio of the light and dark portion of operator 10's eyes as visible along line 20, because of the reliability of such eye trackers, although any known tracker can suffice.

With particular reference to FIG. 2, the visual output of four cameras, 42', 42", 42''', 42'''' are fed along corresponding lines 43', 43", 43''', 43'''' in parallel to multiplexer 40, which forwards the outputs in the form of a time division multiplexed signal, along cable 32 to computer 30, which also receives input from eye tracker 18 as discussed above. Computer 30 de-multiplexes and transmits camera outputs to display 10 such that output from camera 42' displays in quadrant 10' (FIG. 1), output from 42" displays in quadrant 10", output from 42''' displays in quadrant 10''', and output from 42'''' displays in quadrant 10'''', etc.

Directing the outputs from plural cameras 42 to the correct quadrant of display 10 is done preferably by programming computer 30 to do so, although any conventional scheme to do so will suffice. One could, of course, use four different displays, with computer 30 sending respective de-multiplexed outputs to each, but the use of one display such as member 10 in FIG. 1 requires less hardware, and is likely more easily viewable by operator 19. For purposes of this disclosure, the term display includes any array of the outputs of plural monitors that an operator can selectably view at the same time, whether or not all views reside in a unitary display device.

Computer 30 communicates along line 35 to switch 36, which communicates via line 37 with cameras 42 in parallel. Responsive to input of eye tracker 18, computer 30 determines which of quadrants 10 operator 19 is viewing, and enables camera control signals from keyboard 24 and mouse 26 to pass through to the particular camera 42 associated with that quadrant. One preferably does this by providing each camera 42', 42", 42''', 42'''' with a digital interlock (not shown) by which computer 30 via switch 36 can provide a digital code by which to enable a selected one of cameras 42, and disable the remaining cameras.

Thus enabled, lines 35, 37 can communicate commands from keyboard 24 and mouse 26 to the enabled camera, for example the common commands to pan, tilt, zoom, etc. Upon shifting operator line of sight 22 (FIG. 1) to a different quadrant of display 10, eye tracker 18 detects the change and signals the change to computer 30, which in turn signals switch 36 to disable the operative one of cameras 42, and enable for operator control the camera associated with the new quadrant. In this manner, the hands of operator 19 can remain on mouse 26 and the critical keys of keyboard 24 that control camera operation, without having additionally to make physical actions to move among the views of the four cameras 42. Before switching from one camera 42 to another, the system must wait an appropriate time to eliminate spurious switching due to inadvertent short duration operator movements, such as eye blinking or fidgeting in one's chair, etc.

Although FIG. 2 shows communication between computer 30 and cameras 42 by way of a physical switch 36, this is for purposes of illustration. The switching function above described can advantageously be done internally to computer 30 by appropriate conventional programming, and cause direction of control signals to and from cameras 42 via multiplexer 40.

Figure 3:
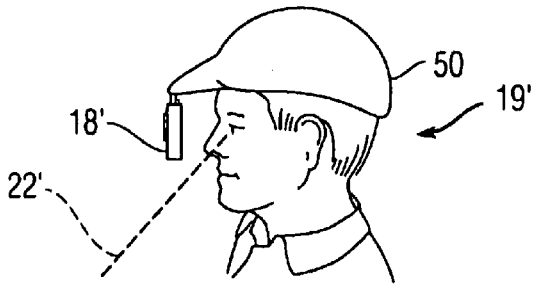
FIG. 3 is an elevation view of an alternate embodiment.

FIG. 3 shows an alternative scheme in which eye tracker 18' mounts directly on operator 19', here on head covering 50, for example a baseball cap, industrial hard hat, head band, etc. Eye tracker 18' directly scans operator 19's line of sight 22' as in the scheme of FIG. 1. The embodiment of FIG. 3 is particularly useful in confined or cluttered spaces in which direct mounting of an eye tracker distant from an operator would likely block the eye tracker's view of the operator.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A system, said system usable by a human operator, comprising:

a plurality of devices, each of said plurality of devices being adapted to perform one or more functions controllable by said operator, said each of said plurality of devices being further disposed effective to produce an output signal;

a display apparatus, said display apparatus disposed effective to present, responsive to said output signal of said each of said plurality of devices, a corresponding plurality of displays, each of said corresponding plurality of displays corresponding to a respective one of said each of said plurality of devices, said each of said corresponding plurality of displays being visually intelligible to said operator; and an eye tracker, said eye tracker being disposed effective to make a determination of the specific one of said corresponding plurality of displays said operator is looking at, said eye tracker being further adapted to generate a signal effective to enable said operator to selectably control at least one of said one or more functions of said respective one of said plurality of devices corresponding to said specific one of said plurality of displays.

2. The system of claim 1, wherein said eye tracker is mounted on said display apparatus.

3. The system of claim 1, wherein said eye tracker is mounted on the head of said operator.

4. The system of claim 1, wherein said display is one screen subdivided into a plurality of portions, each of said plurality of portions corresponding to a respective one of said each of said plurality of displays.

5. The system of claim 1, wherein said display is a plurality of separate displays.

6. The system of claim 1, wherein said plurality of devices is a plurality of cameras, and said each of said plurality of displays presents the visual image produced by a corresponding one of said plurality of cameras.

7. The system of claim 6, wherein said one or more functions is a member of the group consisting of panning, tilting, or zooming said specific one of said plurality cameras.

* * * * *